[112.]

John J. Baringer's Glue Pot.

119,002.   Patented Sep. 19, 1871.

Witnesses,
M. Barner
H. A. Daniels

John J. Baringer, Inventor,
by C. S. Whitman, Attorney.
529 Seventh St
Washington D.C.

UNITED STATES PATENT OFFICE.

JOHN I. BARINGER, OF GERMANTOWN, NEW YORK.

IMPROVEMENT IN GLUE-POTS.

Specification forming part of Letters Patent No. 119,002, dated September 19, 1871.

*To all whom it may concern:*

Be it known that I, JOHN I. BARINGER, of Germantown, in the county of Columbia and in the State of New York, have invented an Improved Glue-Pot; and do hereby declare that the following description, taken in connection with the accompanying drawing, hereinafter referred to, forms a full and exact specification of the same, wherein I have set forth the nature and principles of my said improvements, by which my invention may be distinguished from others of a similar class, together with such parts as I claim and desire to secure by Letters Patent.

My invention relates to pots or vessels used for heating glue, and the nature thereof consists in certain modifications and improvements in the construction of the same, hereinafter described and shown.

Figure 1:
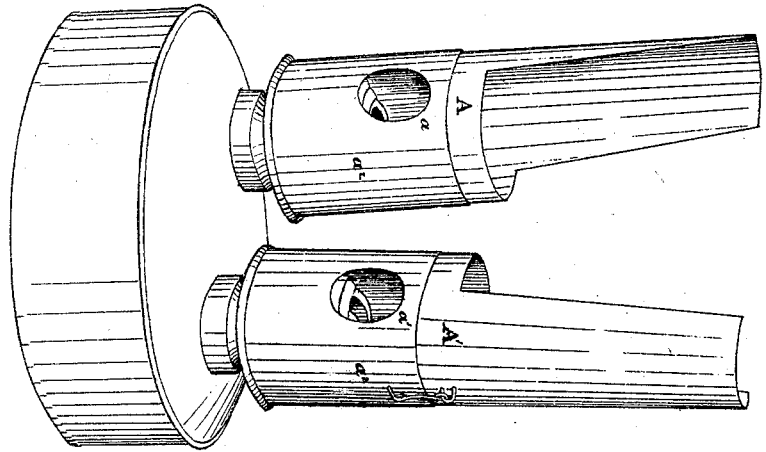
Figure 2:
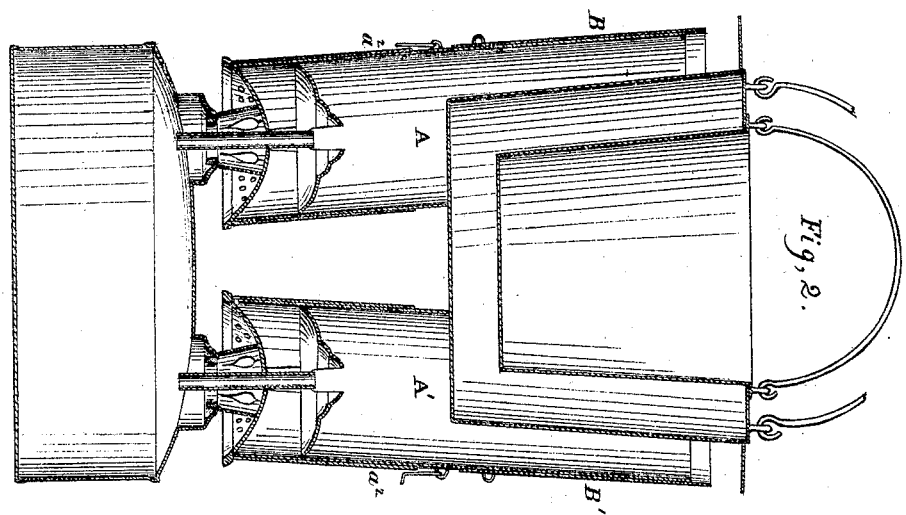

In the accompanying drawing, which illustrates my invention and forms a part of the specification thereof, Figure 1 is a perspective view of the heating apparatus; and Fig. 2, a transverse vertical section of the glue-pot and heating apparatus combined.

The heating apparatus consists of burners of the ordinary form and manufacture, provided with flues or chimneys A A', the lower parts of which are cylindrical in form, and provided with the circular apertures $a$ $a^1$, and an outer cylindrical casing, $a^2$, which may be rotated about the inner cylindrical flues A A', and made to cover or open the said apertures $a$ $a^1$, as may be desired. The upper part of the inner peripherical surface of the said cylindrical flues is cut away, as is shown in the drawing, in such a manner as to fit within the semi-cylindrical chimneys B B' attached to the outer surface of the glue-pot.

By this construction and arrangement of parts the glue-pot may be either used upon a common stove after being removed from the heating apparatus, or used in connection with the heating apparatus in the summer time when fires are not kept up. It may also be adjusted at any desired height above the burners.

I am aware that glue-pots have been heretofore provided with flues in order that they may be properly combined and arranged with lamps, (see patent of James Bragdon, 79,945,) and therefore do not claim the same generically or generally, as the object of my invention more especially consists in providing a glue-pot which may be used either alone or in combination with a lamp.

Having thus described the construction and operation of my invention, I claim and desire to secure by Letters Patent—

A glue-pot provided with chimneys B B', combined with the flues A A', substantially as described.

In testimony that I claim the foregoing I have hereunto set my hand this 20th day of September, 1870.

JNO. I. BARINGER.

Witnesses:
 WM. H. DE WITT,
 JOHN. A. HART.